United States Patent [19]

Fisher

[11] 4,434,870
[45] Mar. 6, 1984

[54] EVACUATION SLIDE DEVICE

[75] Inventor: John M. Fisher, Cuyahoga Falls, Ohio

[73] Assignee: The B. F. Goodrich Company, New York, N.Y.

[21] Appl. No.: 443,424

[22] Filed: Nov. 22, 1982

[51] Int. Cl.³ .......................... A62B 1/20; B65G 11/10
[52] U.S. Cl. .................................... 182/48; 193/25 B; 244/DIG. 2
[58] Field of Search ............. 182/48, 49; 244/DIG. 2; 193/25 B, 25 C

[56] References Cited

U.S. PATENT DOCUMENTS

| | | | |
|---|---|---|---|
| 3,473,641 | 10/1969 | Fisher | 193/25 B |
| 3,656,579 | 4/1972 | Fisher | 182/48 |
| 3,679,025 | 7/1972 | Rummel | 182/48 |
| 3,712,417 | 1/1973 | Chacko | 182/48 |
| 3,811,534 | 5/1974 | Fisher | 182/48 |
| 3,827,094 | 8/1974 | Fisher | 182/48 |
| 3,829,353 | 8/1974 | Fisher | 182/48 |
| 3,833,088 | 9/1974 | Chacko | 182/48 |
| 3,860,984 | 1/1975 | Fisher | 182/48 |
| 4,018,321 | 4/1977 | Fisher | 182/48 |
| 4,378,861 | 4/1983 | Burrough | 182/48 |

*Primary Examiner*—R. P. Machado
*Attorney, Agent, or Firm*—Michael J. Colitz, Jr.

[57] ABSTRACT

An inflatable slide device for emergency evacuation from structures such as aircraft, offshore drilling platforms, etc. The slide device comprises two assemblies of tubular members defining two mutually independent inflatable chambers. One chamber includes tubular members supportive of the slide panel of the device and certain side rail tubular members as well as another tubular member functioning as the central slide support. The other chamber also includes tubular members supportive of the slide panel of the device and certain other side rail tubular members as well as another tubular member also functioning as an additional central slide support.

9 Claims, 12 Drawing Figures

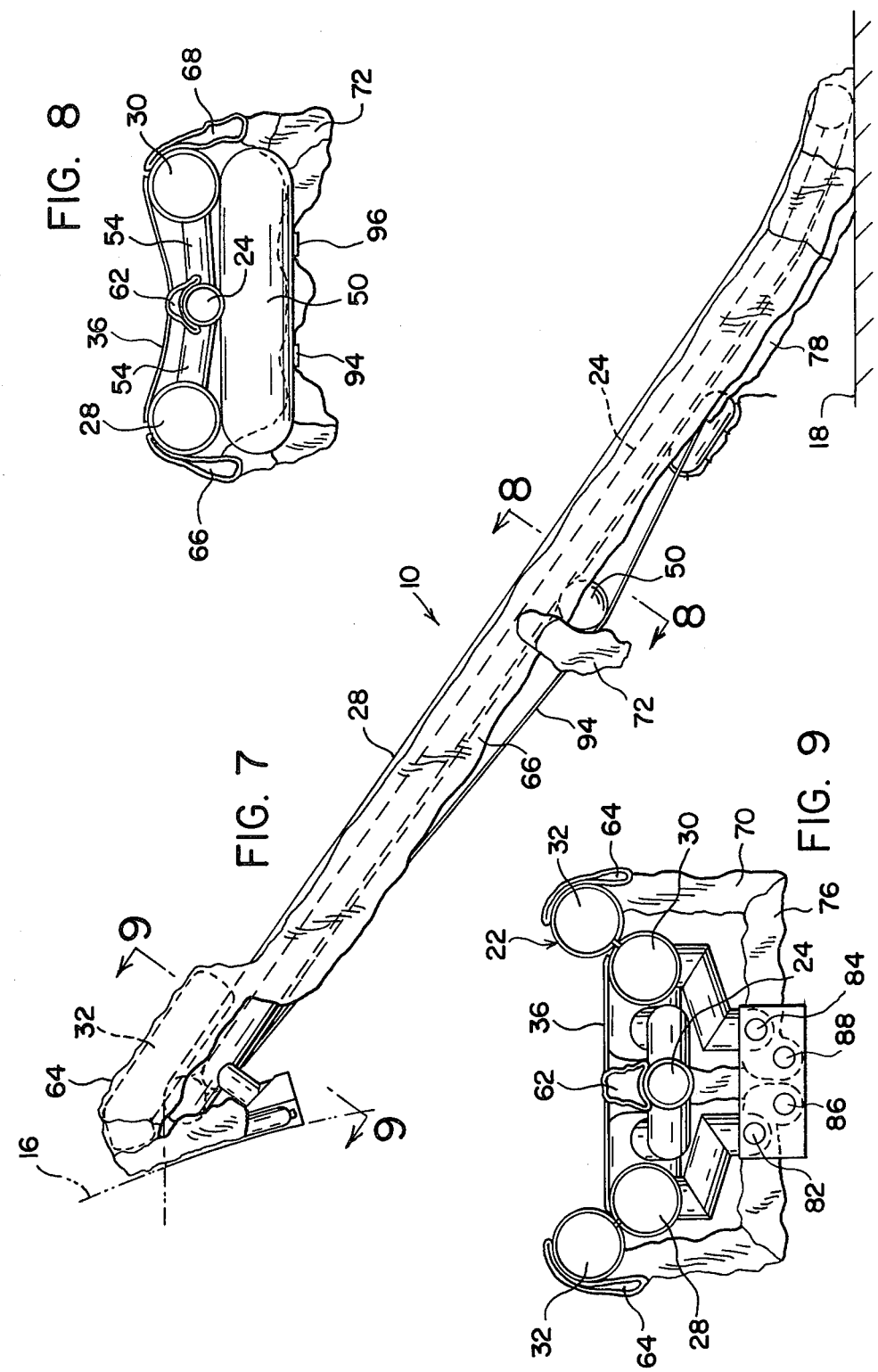

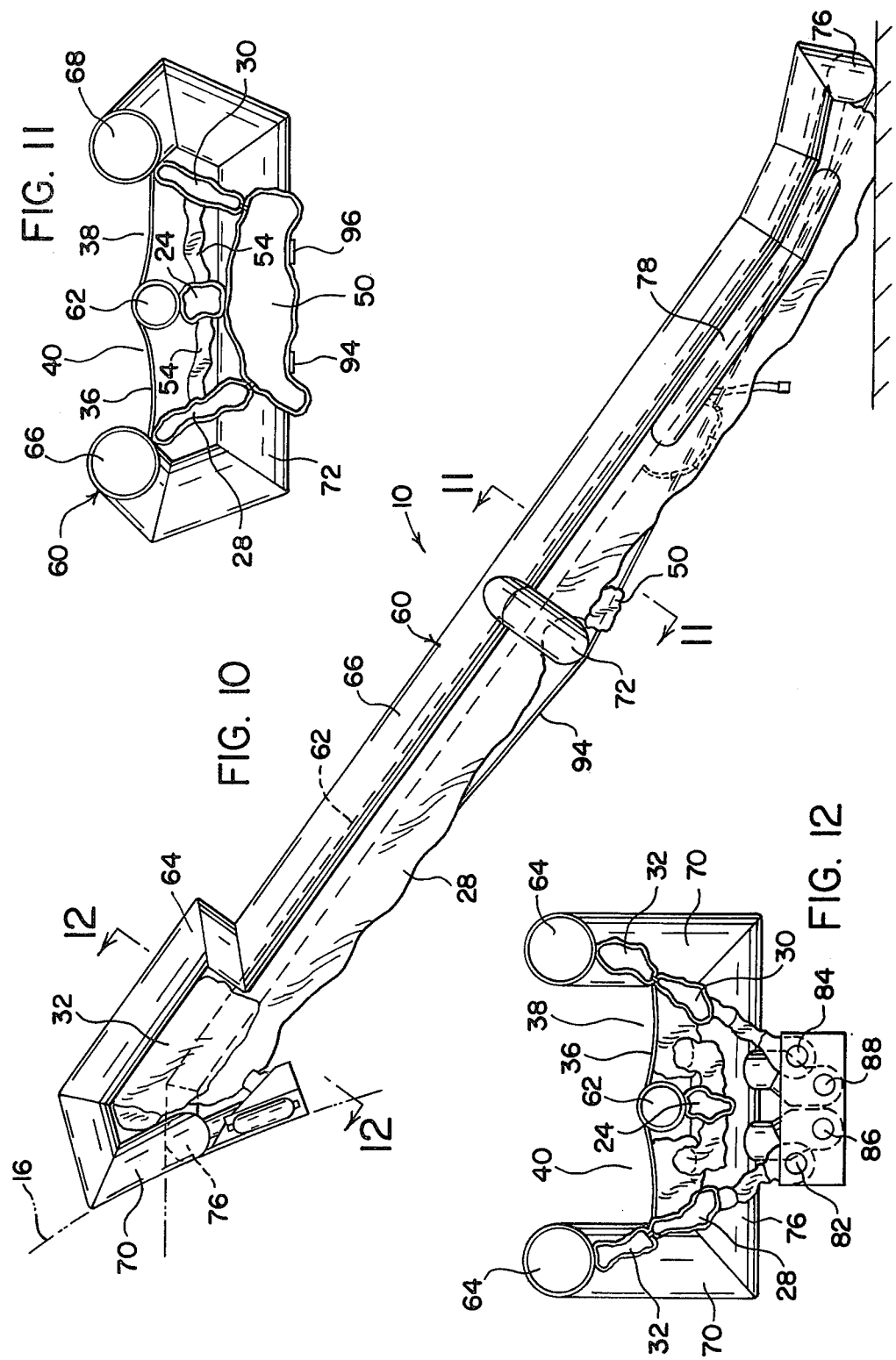

EVACUATION SLIDE DEVICE

BACKGROUND OF THE INVENTION

This invention relates to inflatable evacuation slide devices and particularly to such devices which comprise a dual lane slide panel and two independently inflatable chambers, each formed by assemblies of interconnecting tubular members.

Structures such as aircraft, off-shore drilling platforms and the like are often equipped with inflatable evacuation slide devices for use by persons wishing to quickly vacate the structure in the event of an emergency. These slide devices are normally stored uninflated on the structure in a position readily available for quick deployment.

Some of these slides are structural combinations of two fluidly independent, inflatable assemblies of tubular members defining independent chambers so that the loss or lack of the inflation medium from one chamber does not cause total collapse of the device but, rather, leaves an inflated assembly available for safe usage. Dual chambered slide devices should thus be designed to maintain utility in the event one chamber fails to inflate or is suddenly deflated. However, because of particular choices in tubular member design, the use of such known devices as a slide when only one of the chambers is inflated is not without problems. Examples of known prior art slides are disclosed in U.S. Pat. Nos. 3,712,417; 3,827,094; 3,833,088 and 3,860,984.

For example, if what is commonly known as the upper chamber is inflated, the slide surface can be substantially without side rails protecting against a person sliding off the device at points along the length of the device. Alternatively, when what is commonly known as the lower chamber is deflated, the slide panel may lose its dual lane contour and reform itself as a deep trough with essentially no support along its underside.

Further, several of the more recent slide systems use truss members extending transversely on the underside of the slide panel to add rigidity to the slide panel device and holds the slide in an extended position laterally. Note U.S. Pat. No. 3,473,641 for example. These truss members usually are composed of inflated tubes or bags which are interconnected with one or the other of the two chambers comprising the slide device. Loss of one chamber may thus result in a slide without an effective lateral truss support.

SUMMARY OF THE INVENTION

The present invention provides a dual chamber inflatable slide device where deflation of either one or the other of the plural inflatable chambers will result in a remaining structure not having the above described problems.

A dual chambered slide device constructed according to the present invention includes two fluid independent chambers joined together with each formed of pluralities of interconnecting tubular members designed so that each plurality includes certain tubular members which share in performing functions principally performed by the total of the plurality.

Specifically, the slide device of the present invention includes a first or lower chamber composed of tubular members supporting a slide panel. The tubular members are interconnected and include a central longitudinal tube and side rail tubes and a truss member as well as additional tubular members which function to pneumatically interconnect the other tubes. Furthermore, the slide device also includes a second or upper chamber composed of a central longitudinal tube and side rail tubes and a truss member as well as additional tubular members which function to pneumatically interconnect the other tubes. The tubes of the upper and lower chambers independently support a dual lane slide.

According to the invention the foregoing features are attained through an improved inflatable escape slide formed of inflatable tubular members in such fashion that the inflation of either of the two inflatable sections will still result in a safe and useful escape slide.

BRIEF DESCRIPTION OF THE DRAWINGS

The appended drawings illustrate the preferred embodiment made according to the present invention.

In the drawings:

FIG. 5 is a cross-sectional view of the escape slide as shown in FIG. 2 taken along lines 5-5 of FIG. 2.

FIG. 6 is a cross-sectional view of the escape slide taken along lines 6—6 of FIG. 2.

FIG. 7 is a side elevational view of the escape slide as shown in FIGS. 1 and 2 but with only the upper sections in an uninflated condition.

FIG. 8 is a cross-sectional view taken along lines 8—8 of FIG. 7.

FIG. 9 is a cross-sectional view taken along lines 9—9 of FIG. 7.

FIG. 10 is a side elevational view of the escape slide as shown in FIGS. 1 and 2 but with only the lower section in an uninflated condition.

FIG. 11 is a cross-sectional view taken along lines 11—11 of FIG. 10.

FIG. 12 is a cross-sectional view taken along lines 12—12 of FIG. 10.

DETAILED DESCRIPTION OF THE INVENTION

Figure 1:
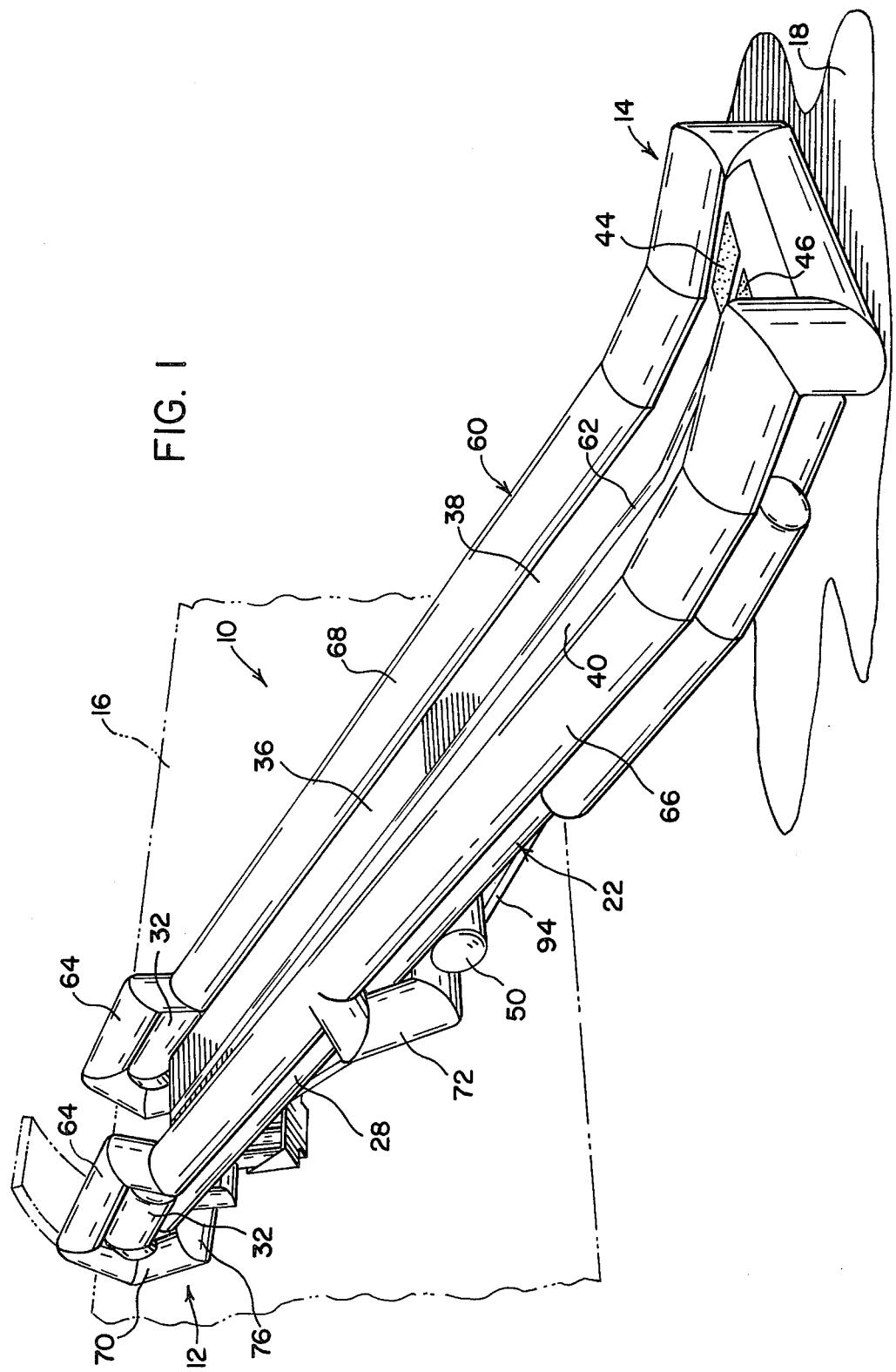
FIG. 1 is a perspective diagramatic view of an escape slide constructed in accordance with the primary embodiment of the instant invention.
Figure 2:
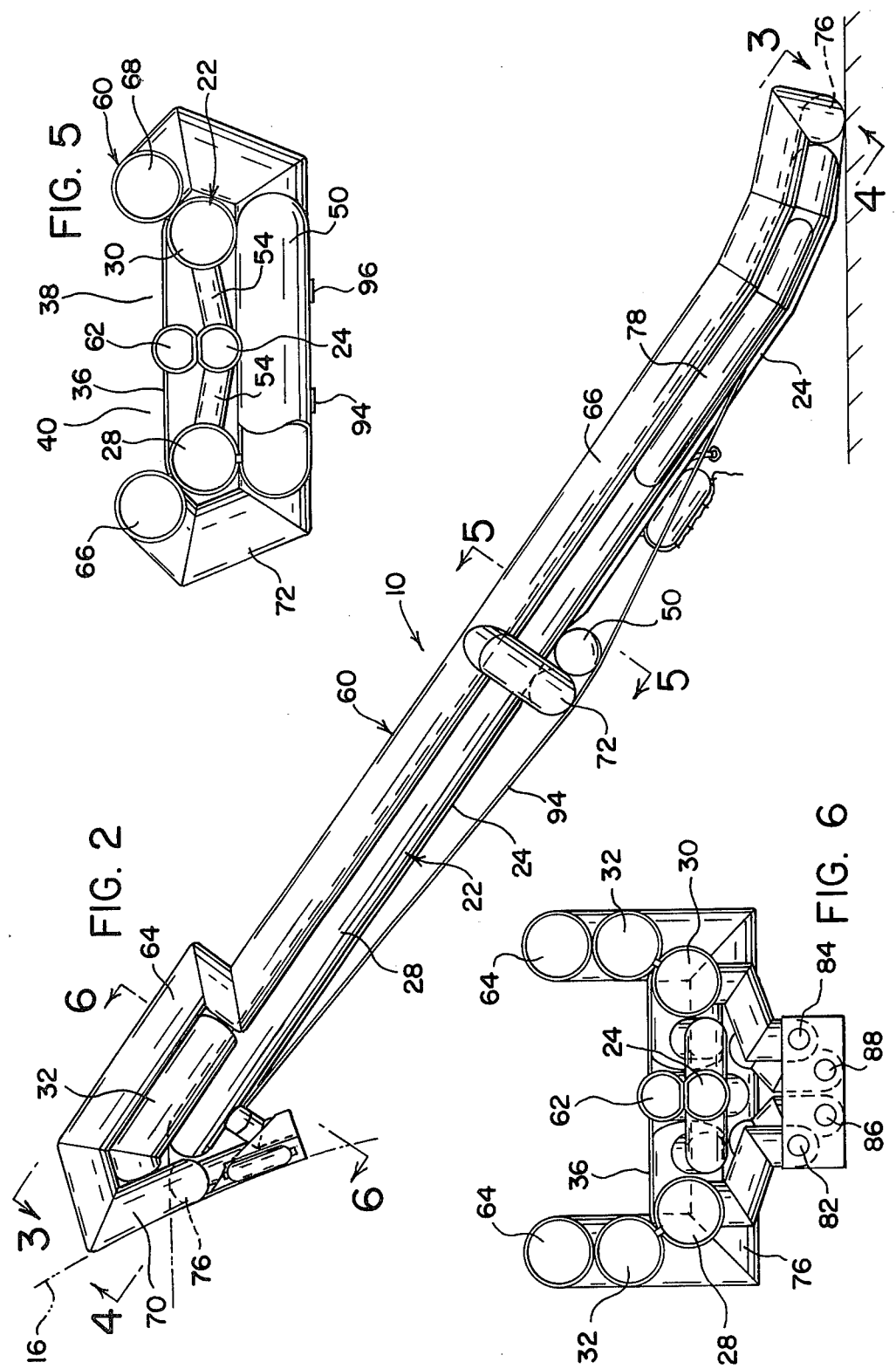
FIG. 2 is a side elevational view of the escape slide as shown in FIG. 1 extending to the ground from an aircraft exit door shown in phantom lines.
Figure 3:
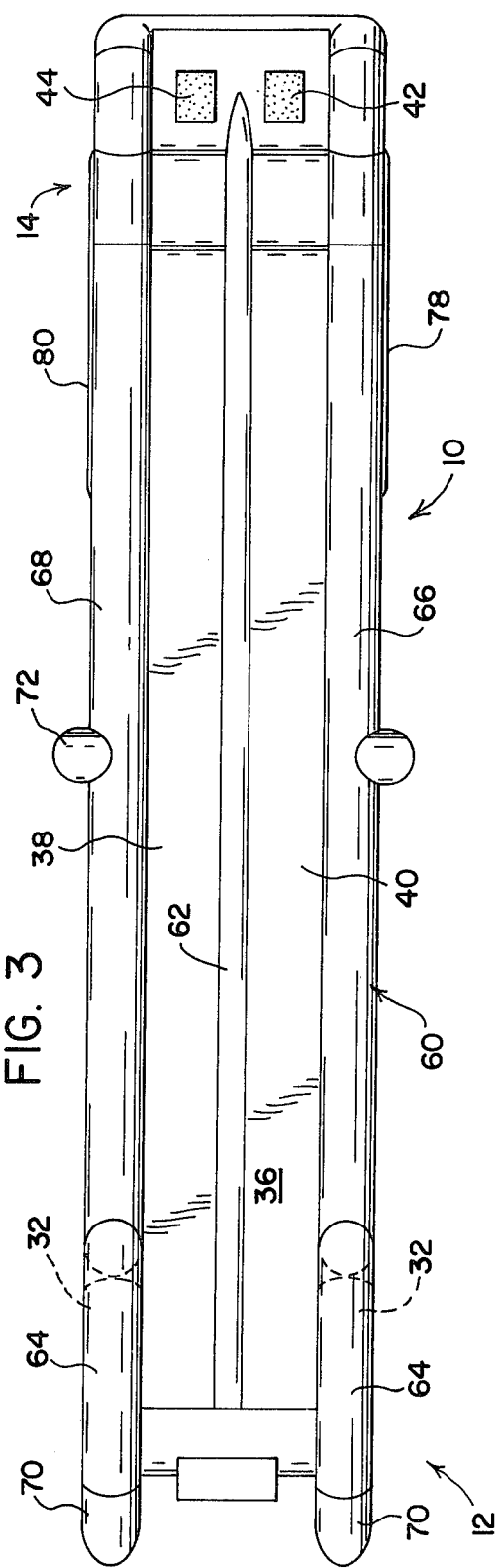
FIG. 3 is a plan view of the top surface of the escape slide of FIG. 1.
Figure 4:
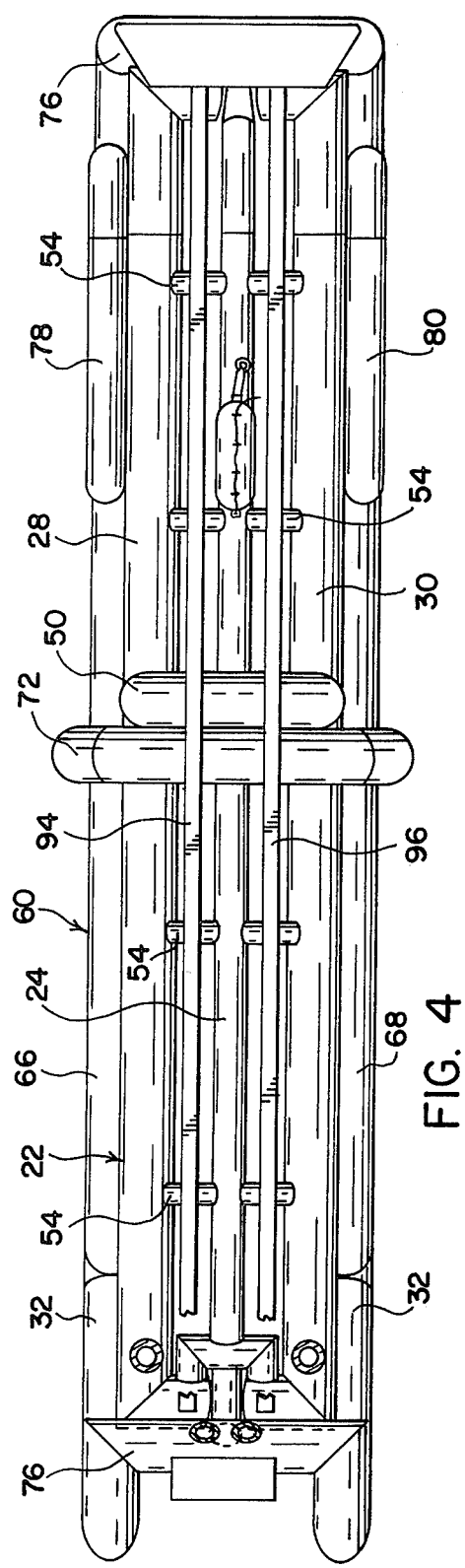
FIG. 4 is plan view of the bottom surface of the escape slide as shown in FIG. 1.

Referring now to the drawings wherein like reference characters designate like or corresponding parts throughout the several views there is shown in the various figures an inflatable evacuation slide device constructed in accordance with the principles of the instant invention.

The slide device is generally designated by numeral 10 and includes a head end 12 and a foot end 14 adapted to couple an exit door of an aircraft 16 or other area with a ground portion 18.

The entire device is preferably fabricated from an air impervious material preferably an elastomer such as urethane or other suitable elastomer which is preferably coated with a fabric. The various parts may be joined together with a suitable adhesive whereby the composite structure will preclude air flow from the various chambers during operation in the inflated state including operation in and around water.

With reference to the various figures, the lower inflatable section or chamber 22 includes a central tubular member 24 extending along the axial centerline of the device from the head end to foot end. Parallel therewith are side rails 28 and 30 also extending from the head to foot of the slide device and are contoured adjacent the head end to create elevated shoulders 32 adjacent the aircraft from which the evacuees would be entering the slide. The side tubes contour upwardly to provide an additional restraint for evacuees adjacent the head or entrance end of the slide. The side rails of the lower section are coupled with the longitudinal support tube by a slide panel 36 down which the evacuees would slide in an emergency situation.

The central support tube 24 divides the slide sheet into parallel two lanes, a left lane 38 and a right lane 40. The slide panel 36 and the top of the lower central support tube 24 have their uppermost extents located beneath the uppermost extent of its associated side tubes 28 and 30 so that the side tubes can function to preclude the evacuees from sliding over the sides of the slide along its length.

Adjacent the bottom or foot end 14 of the slide device are friction panels 44 and 46 to reduce the speed of motion of the evacuees adjacent the foot portion of the device. The central section of the slide device also includes a transverse truss bag 50 for providing lateral support adjacent the central support of the slide device. Additional lateral support to the lower sections is provided by additional transverse tubes 54 to facilitate the communication between the various tubular members adjacent the upper and lower portions of the slide device to assist in pneumatically coupling the various tubular members constituting the lower chamber of the slide device.

The upper portion or chamber 60 of the slide device is provided with similar interconnected tubular members inflatable independently of the first or lower portion of the slide device but physically adhered thereto with a suitable adhesive. The upper portion includes a longitudinal central support tube member 62 extending from the head 12 to the foot 14 of the device along a longitudinal center line. Coupled therewith are side support tubes which function as rails 66 and 68 which, adjacent the head end 12 are contoured to extend upwardly at 64 to provide added side support for evacuees entering the slide. The upper slide support is then contoured downwardly at 70 to encompass the head end of the side tubes of the lower portion adjacent the head end and thus provide support for resting against the aircraft when the device is deployed. This contoured portion also provides additional side restraints for additional safety of evacuees entering the slide device.

Also in pneumatic communication with the upper chamber 60 are auxiliary support tubes 78 and 80 adjacent the side rails 66 and 68. These auxiliary support tubes parallel the side adjacent the lower, bending portion of the slide and have been found desirable to preclude the upper chamber, when functioning without the support of the lower chamber, from bending and bottoming out prematurely when supporting higher than normal weight loads by evacuees.

A truss bag 72 for side lateral support is also provided transverse to the longitudinal line adjacent the truss bag 50 for the lower section. The upper chamber truss bag 72 thus provides lateral support for the lower chamber as well as the upper chamber when the slide is fully deployed. Additional transverse tubular members 76 and 78 are also provided adjacent the foot and head ends of the device for permitting the interconnection of the various tubular members which constitute the upper portion of the device. Similar to the lower chamber 22, the upper extends of the side rails 66 and 68 of the upper chamber 60 extend above the slide panel 36 as well as above the upper extent of the central tubular member 62 for precluding an evacuatee from inadvertently falling over the side of the slide device when in operation either with one or both of the chambers inflated.

Provided on the bottom side of the device is a pair of truss straps 94 and 96 for providing the appropriate tension from the head end to the foot end of the slide device during deployment. Truss straps are disclosed in several of the aforementioned U.S. patents.

Inflation devices are provided at 82, 84, 86 and 88 for filling the upper and lower chambers with aeroform fluid. These devices are located adjacent the head end of the slide. Two sources 82 and 84 are coupled with the upper chamber 22 and two sources 86 and 88 are coupled with the upper chamber 60. All are rendered operative to fill the slide device with an appropriate aeroform fluid during deployment of the slide to thereby provide a path of safety for evacuees from the aircraft adjacent the head end of the slide device to ground safety adjacent the foot end of the slide device. A preferred inflation device for this purpose is disclosed in U.S. Pat. No. 3,840,057.

By dividing the prior art center line tube as described above into two separately inflatable independent tubes 24 and 62 each chamber has thus two large side tubes and one smaller central tube thereby equalizing volumes and strengths which is related to the tube size and number. To further equalize strength, the second truss tube 72 is attached parallel to the first truss tube 50 and routed into the upper chamber. In this configuration the truss arrangement will function with either chamber deflated and either chamber will have approximately the same bending resistance. The two truss straps 92 and 94 act in connection with both truss tubes or with either truss tube alone. The upper chamber truss tube also serves as a spreader member with the bottom chamber deflated to hold the upper chamber tubes apart. This serves to prevent sagging of the slide panel surface in the middle of the slide.

During deployment, it has been found desirable to restrain full separation of the upper and lower ends of the slide device until a predetermined pneumatic pressure has been achieved. To this end a restraint device should be utilized, preferably of the type as disclosed in U.S. Patent Application Ser. No. 443,425 filed concurrently therewith in the name of John M. Fisher.

While it is contemplated that the operation of the device could function completely adequately with only the top inflatable chambers or the lower inflatable chamber inflated, a composite of both sections fully inflated will superiorly perform the safety function for which the device is intended.

Various modifications are contemplated and may obviously be resorted to by those skilled in the art without departing from the described invention, as hereinafter defined by the appended claims, as only a preferred embodiment thereof has been disclosed.

What is claimed is:

1. An inflatable slide device for emergency evacuation having a flexible panel defining a slide surface extending from a head end of the inflatable slide device to a foot end of the inflatable side device and a first plurality of interconnected tubular members defining a first inflatable chamber, a second plurality of interconnected tubular members defining a second inflatable chamber fluidly independent of said first chamber, each of said chambers including tubular rail means along portions of each lateral margin of said panel, said rail means being raised from said flexible panel along the slide and contoured for being raised even higher from the slide panel adjacent the head end of the slide device.

2. An inflatable slide device as set forth in claim 1 wherein each chamber includes a central longitudinal support tube to divide the slide panel into two lanes from the head end to the foot end.

3. The device as set forth in claim 1 and further including a plurality of truss supports extending beneath said panel member transverse to the axial center line of the device, said truss supports being fluidly independent of each other.

4. An inflatable slide device for emergency evacuation having a flexible panel defining a slide surface extending from a head portion of the inflatable slide device to a foot portion of the inflatable slide device and a first plurality of interconnected tubular members defining a first inflatable chamber, a second plurality of interconnected tubular members defining a second inflatable chamber fluidly independent of said first chamber, each of said chambers including tubular rail means along portions of each lateral margin of said panel and a central longitudinal support tube.

5. An inflatable slide device as set forth in claim 4 wherein said central longitudinal support tubes are located one above the other.

6. An inflatable slide device as set forth in claim 4 wherein the top of each central longitudinal support tube is located in a plane beneath the top of its associated tubular rail means.

7. An inflatable slide device for emergency evacuation having a first plurality of tubular members defining a first inflatable chamber a second plurality of tubular members defining a second inflatable chamber fluidly independent of said first chamber, a flexible panel defining a slide surface extending from a head end of the slide device to a foot end of the slide device, each of said chambers including an inflatable tubular means longitudinally disposed beneath said panel and extending adjacent the longitudinal center line of the panel along its length to support said panel and form said slide surface into two lanes each of said chambers also including tubular means disposed adjacent the edges of the panel along its length to define side supports and each of said chambers also including tubular means beneath the panel at a central location to define lateral truss supports.

8. An inflatable slide device as set forth in claim 7 wherein at least one of said last mentioned tubular means extends around to the sides of the slide device for added support.

9. An inflatable slide device as set forth in claim 8 and further including strap means extending beneath said panel member parallel with the axial center line of the device from the head end to the foot end for added longitudinal support.

* * * * *